United States Patent
Khandkar et al.

[11] Patent Number: 5,712,055
[45] Date of Patent: Jan. 27, 1998

[54] MULTI-STAGE FUEL CELL ARRANGEMENT

[75] Inventors: Ashok C. Khandkar, Salt Lake, Utah; Singaravelu Elangovan, Sandy, Utah

[73] Assignee: Gas Research Institute, Chicago, Ill.

[21] Appl. No.: 808,123

[22] Filed: Feb. 28, 1997

Related U.S. Application Data

[60] Provisional application No. 60/012,509 Feb. 29, 1996.
[51] Int. Cl.⁶ ........................................... H01M 8/10
[52] U.S. Cl. ............................ 429/31; 429/33; 429/34
[58] Field of Search ............................ 429/31, 32, 34, 429/12, 30, 33

[56] References Cited

U.S. PATENT DOCUMENTS

| | | | |
|---|---|---|---|
| 4,002,493 | 1/1977 | Warszawski | 429/26 |
| 4,532,192 | 7/1985 | Baker et al. | 429/19 |
| 4,567,117 | 1/1986 | Patel et al. | 429/19 |
| 4,666,798 | 5/1987 | Herceg | 429/12 |
| 4,728,584 | 3/1988 | Isenberg | 429/31 |
| 4,816,036 | 3/1989 | Kotchick | 29/623.3 |
| 4,883,497 | 11/1989 | Clear et al. | 29/623.5 |
| 5,009,763 | 4/1991 | Hise | 204/255 |
| 5,035,961 | 7/1991 | Riley | 429/30 |
| 5,178,970 | 1/1993 | Jansing et al. | 429/38 |
| 5,198,312 | 3/1993 | Irino et al. | 429/26 |
| 5,270,131 | 12/1993 | Diethelm et al. | 429/34 |
| 5,387,476 | 2/1995 | Koch et al. | 429/12 |
| 5,500,292 | 3/1996 | Muranaka et al. | 429/33 X |
| 5,587,251 | 12/1996 | Spach et al. | 429/33 |
| 5,591,537 | 1/1997 | Bagger et al. | 429/33 |

Primary Examiner—Anthony Skapars
Attorney, Agent, or Firm—Dick and Harris

[57] ABSTRACT

A multi-stage arrangement for the electrolyte material in a SOFC electrochemical power system. Multiple stages may be arranged in series, and each stage contains electrolyte elements which are constructed of a different material from the elements in previous and subsequent stages. A fuel gas admitted to the power system flows serially through each stage and is then exhausted from the power system. Upstream stages contain electrolyte elements made from an electrolyte material having low ion conductivity and high resistance. Subsequent stages contain electrolytes having progressively higher conductivity and progressively lower resistance. The fuel exhaust from an upstream stage is fed to the next downstream stage until the gas is exhausted from the final stage in the power system. Each stage operates at a progressively lower temperature than the previous stage. In a three-stage embodiment, a first stage has $ZrO_2$, electrolyte material, a second stage has $CeO_2$, and a third stage has $Bi_2O_3$. The multi-stage fuel cell arrangement leads to a higher total power output for the same initial mass flow rate of fuel gases though the fuel cells.

17 Claims, 2 Drawing Sheets

MULTI-STAGE FUEL CELL ARRANGEMENT

This application depends from and claims priority, under 35 U.S.C. @119(e) of U.S. Provisional application Ser. No. 60/012,509 filed Feb. 29, 1996.

TECHNICAL FIELD

The invention relates to arrangements for solid state electrolyte elements in electrochemical power systems, and more particularly to a multi-stage arrangement wherein a series of stages contain electrolyte materials having progressively greater ion conductivity.

BACKGROUND

Solid oxide fuel cells (SOFC's) utilize ion specific electrolyte materials to convert chemical energy into electrical energy. The electrolyte elements in SOFC based power systems are typically constructed from ceramic metal oxides such as zirconium oxide ($ZrO_3$), cerium oxide ($CeO_2$), bismuth oxide ($Bi_2O_3$), or a variety of other solid state materials. The electrolyte materials only permit passage of a specific type or size of ion through the material. For example, zirconium oxide, cerium oxide, and bismuth oxide mentioned above are specific for $O^{-2}$ ion conduction. Material specific for proton ($H^+$) conduction include perovskites such as strontium cerate ($SrCeO_3$) and barium cerate ($BaCeO_3$),β-aluminas, and several organic compounds such as hydrogen uranyl phosphate (HUP). Various other materials may be used for conduction of other specific ions.

Typically, the electrolyte elements are formed as thin flat plates of the electrolyte material with an electrically conductive electrode material adherent to one or both of the plate's flat surfaces. The electrode material serves as a catalyst to generate the ionic species from a reactant gas which contains the parent species of the ion. A plurality of electrolyte elements may be arranged into a fuel cell stack whereby each element is spaced apart from adjacent elements to enable the reactant gases to flow between the elements. A common electrochemical power system arrangement includes a plurality of these fuel cell stacks arranged in some space efficient manner, and electrically connected together. The electrolyte elements within a fuel cell stack are typically connected in electrical series, whereas the stacks are typically connected together in electrical parallel. Series connection of the elements increases the amount of current obtained from each fuel cell stack, while parallel connection of the stacks increases the voltage potential of the power system and permits continued operation in the event one of the fuel cells fails. It is to the arrangement of the electrolyte elements in electrochemical power systems, and the composition of the electrolyte material in the fuel cells that this application is directed.

When certain reagent gases containing the parent species of the desired specific ion come in contact with the electrode material attached to the surface of the electrolyte elements of a fuel cell, an electrochemical reaction occurs which yields an ionic species. The ionic species is then conducted through the electrolyte material to the electrode on the opposite surface where it reacts with a fuel gas to form $CO_2$ and $H_2O$. This electrochemical combustion reaction can be illustrated by the following chemical half reactions where, for example, $O^{-2}$ (from air) is the specific ion, and methane ($CH_4$) is the fuel gas:

air side:

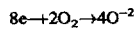

fuel side:

This reaction occurs when the plates reach an operating temperature, typically 600°–1000° C. for ceramic oxide based fuel cells, and lower for polymer and molten electrolyte membranes. It the two electrodes on opposite sides of the plate are electrically connected, an electrical current may be obtained by the flow of the electrons involved in the reaction between the two electrode surfaces. Thermal energy released from combustion of the fuel gas contributes to maintaining the operating temperature.

The "driving force" for conduction of $O^{-2}$ ions through an electrolyte plate is provided by the difference in the partial pressure of oxygen on opposite sides of the plate. This "driving force" is referred to as the equilibrium Nernst potential of the power system, and can be calculated with the Nernst equation shown below (where $O^{-2}$ is the specific ion, $CH_4$ is the fuel gas, and the products from the electrochemical combustion reaction are $CO_2$ and $H_2O$):

$$\mathscr{E} = \mathscr{E}^0 - \frac{2.303\, RT}{n\mathscr{F}} \log \left\{ \frac{[CO_2][H_2O]^2}{[O_2]^2[CH^4]} \right\}$$

where:

$\mathscr{E}$=Potential $\mathscr{E}$=Potential with chemicals in standard states R=Gas constant T=Temperature in Kelvin n=Number of electrons f=Faraday constant where:

$\mathscr{E}$=the Nernst potential in volts $\mathscr{E}$=the Nernst potential in volts at unit concentration of the gases (with chemicals in standard states)

R=gas constant in J mol$^{-1}$ K$^{-1}$

T=temperature in ° Kelvin n=number of electrons transferred $\mathscr{F}$=the Faraday constant in J V$^{-1}$ Alternatively, in current based devices, an electrical potential applied across the plates is used to drive the reaction at a rate typically more rapid than that obtainable through passive diffusion of the ions through the electrolyte.

According to the Nernst equation, the "driving force" or equilibrium Nernst potential $\mathscr{E}$ of the fuel cell continuously decreases as the concentration of the fuel gas $CH_4$, is reduced due to consumption, and concomitantly, the concentration of oxidation products, $CO_2$ and $O_2$, are increased. As fuel gas flows through the fuel cell, the "driving force" (or Nernst potential) continues to decrease with fuel utilization until a voltage is reached beyond which further operation of the fuel cell with the same fuel charge is impractical. This situation occurs when the fuel gas has been approximately 85% consumed. The lowering of the driving force limits the operating voltage. In other words, a point exists where efficient fuel utilization becomes impractical in the face of decreased operating cell voltage.

To overcome this reduction in operating cell voltage, excess fuel gas is continuously fed through the electrolyte plates, and this results in lower fuel utilization. Alternatively, the fuel cell can be operated at lower temperatures and the driving force or Nernst potential is higher for the same fuel composition thus allowing a higher operating voltage. However, the electrolyte resistance increases at lower temperature resulting in lower power output. Thus, a more practical method for increasing the output from the fuel cell without compromising fuel utilization would be a useful contribution to the art.

U.S. Pat. No. 4,666,798 to Herceg (May 19, 1987) discloses a fuel cell having serially connected monolithic electrolyte cores. Herceg discusses the problem of serially connected monolithic elect decreasing voltage output with consumption of the fuel gas, and uses a monolithic core construction to minimize inactive areas of the electrolyte material to improve fuel utilization.

Several U.S. Patents, e.g., U.S. Pat. No. 4,532,192 to Baker et al. (Jul. 30, 1985), uses reformation of exhaust fuel gases from the power system to recover the unused fuel. U.S. Pat. Nos. 3,488,226 and 4,182,795 (Baker et al.) teach combustion of exhaust fuel gases to generate heat for operation of a power system.

A need exists for a fuel cell arrangement which improves fuel gas utilization without a concomitant sacrifice in operating cell voltage.

DISCLOSURE OF THE INVENTION

While this invention is susceptible of embodiment in many different forms, there is shown in the drawings and will be described in detail herein, a specific embodiment, with the understanding that the present disclosure is intended to be an exemplification of the principles of the invention and is not intended to limit the invention to the embodiment illustrated.

The invention includes a multi-stage arrangement for the electrolyte material in a SOFC electrochemical power system. In one arrangement, the multiple stages are arranged in series, and each stage contains electrolyte elements which are constructed of a different material from the elements in previous and subsequent stages. A fuel gas admitted to the power system flows serially through each stage and is then exhausted from the power system.

Initial stages (i.e. stages upstream in the fuel gas flow) contain electrolyte elements made from an electrolyte material having low ion conductivity (i.e. high resistance). Subsequent stages contain electrolytes having progressively higher conductivity (and progressively lower resistance). The fuel exhaust from an upstream stage is fed to the next downstream stage until the gas is exhausted from the final stage in the power system. Each stage operates at a progressively lower temperature than the previous stage.

By arranging the stages in increasing order of electrolyte conductivity, a "driving force", or operating cell voltage $V_{OP}$, which is insufficient for practical ion conduction through the first stage is, however, sufficient to drive the reaction through subsequent stages having higher conductivity electrolytes. The power system will produce more current, and thus more power from the same rate of fuel gas flow.

In a three-stage embodiment, a first stage has $ZrO_2$ electrolyte material, a second stage has $CeO_2$ and a third stage has $Bi_2O_3$. When the operating cell voltage $V_{op}$ for the $ZrO_2$ electrolyte has dropped to a value where operation of the fuel cell becomes inefficient, the voltage potential for the subsequent stage having a higher conductivity electrolyte remains above the voltage output by the first stage. The same situation occurs when the $V_{op}$ from the $CeO_2$ electrolyte stage drops and the higher conductivity $Bi_2O_3$ stage remains practicably functional. Fuel gases cascaded through the series of stages thus produce more power from the same gas flow rate, along with high fuel gas utilization.

The stability of low conductivity material such as $ZrO_2$ is better at low oxygen partial pressures of incoming fuel and is thus ideal for location upstream in the fuel gas flow. Stability of higher conductivity materials such as $CeO_2$ and $Bi_2O_3$ decreases (in that order) but are stable in partially utilized fuel and thus are ideal for the subsequent lower temperature stages. They retain their higher conductivities at acceptable levels at lower temperatures. It must be noted that the high conductivity is necessary for lower temperature stages for high efficiency operation but lower stability is not a requirement. The present scheme can accommodate lower stability electrolytes by appropriate fuel utilization in upstream stages.

Other known electrolyte materials of varying conductivities can be utilized in the several stages.

The multi-stage fuel cell arrangement thus leads to a higher total power output for the same initial mass flow rate of fuel gases through the fuel cells. Fuel gas utilization is also high without the problematic loss of voltage efficiency.

A better understanding of the multi-stage fuel cell arrangement may be had from the following drawings and description of the preferred embodiment.

BEST MODE OF THE INVENTION

Figure 1:
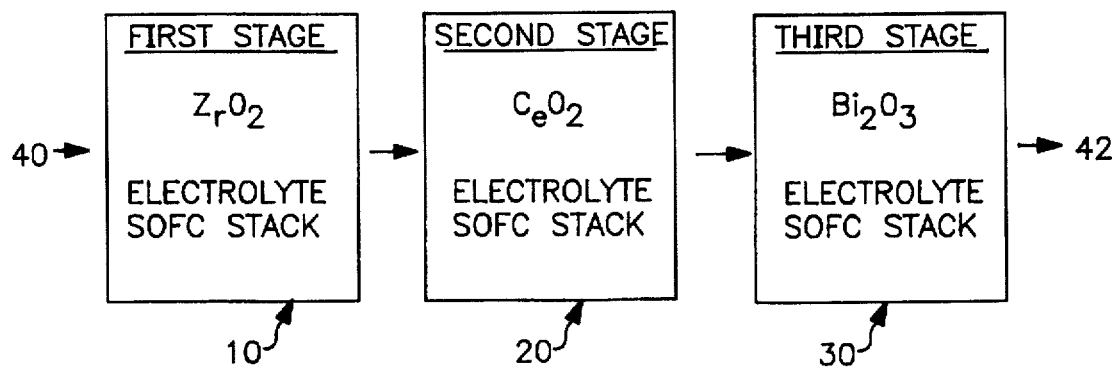
FIG. 1 is a schematic representation of a three-stage fuel cell arrangement according to the instant invention having a specified electrolyte material in each stage.

Referring to FIG. 1, a schematic representation of a three-stage embodiment of the multi-stage fuel cell arrangement includes first, second and third stages indicated respectively as 10, 20, and 30. Any number of stages may be included in the multi-stage arrangement depending on the constraints and requirements of a particular application. First, second, and third stages 10, 20, and 30 may include any amount or type of electrolyte material, and the electrolyte may be arranged or constructed in any configuration. Additionally, any number of identical stages may be arranged in series with each stage comprising one or more assemblages of electrolyte elements. Preferable configurations include one or more stacks of spaced-apart solid oxide electrolyte elements, and monolithic stacks of electrolyte elements. First, second, and third stages 10, 20, and 30 may be juxtaposed in any configuration permitting flow of a fluid serially through the stages. In a preferred embodiment, first, second, and third stages 10, 20, and 30 are SOFC stacks arranged in a series so that a fuel gas indicated as 40 may be directed to flow into first stage 10. Upon discharge of the fuel gas 40 from first stage 10, the gas serially flows through second stage 20 and third stage 30.

Different electrolyte material is employed in each of stages 10, 20, and 30. In a preferred combination, the electrolyte material in first stage 10 is $ZrO_2$, the material in second stage 20 is $CeO_2$, and the material in third stage 30 is $Bi_2O_3$. Fuel gases 40 fed to the power system first flow through the $ZrO_2$ elements, and subsequently through the $CeO_2$ and $Bi_2O_3$ elements. The spent fuel gas exhaust 42 from the last fuel cell stage in the series may be consumed in an afterburner, subjected to a bottoming cycle, or subjected to a cogeneration cycle to recover uncombusted fuel gas.

The relative conductivity of $ZrO_2$ is less than the conductivity of either $CeO_2$ or $Bi_2O_3$. The resistance of $ZrO_2$, is also greater that the resistance of either $CeO_2$ or $Bi_2O_3$. Therefore, for a given operating cell voltage $V_{op}$, the cell with the lower resistance electrolyte will produce more current, and thus more power. However, electrolyte materials with higher resistance, such as $ZrO_2$, are more stable than lower resistance materials.

The result of the multi-stage fuel cell arrangement is high efficiency power production in combination with increased power from the same mass flow rate of fuel gas through the power system. Fuel gas utilization is increased without the usual consequent reduction in operating cell voltage. Fuel gases initially flowing through the electrolyte elements in first stage 10 partially deplete the fuel gas. The partially spent fuel from first stage 10 is no longer practically usable for high efficiency operation in similar electrolyte elements but can be efficiently used by second stage 20 having electrolyte elements composed of the lower resistance $CeO_2$ electrolyte material. Likewise, the further spent fuel gas discharged from second stack 20 is no longer practically usable by electrolytes having similar resistance but can be efficiently used by third stack 30 having electrolyte elements constructed from the still lower resistance $Bi_2O_3$ electrolyte material.

The operating temperature for low conductivity electrolytes, such as $ZrO_2$, is higher than the operating temperature for higher conductivity materials such as $Bi_2O_3$. Accordingly, the lower conductivity materials used upstream in the fuel gas flow require a high operating temperature, the higher conductivity materials used downstream in the fuel gas flow, after the gas flow has cooled the elements, do not require the comparatively high operating temperature. Accordingly, the operating temperature of the power system decreases along the fuel gas flow pathway.

The electrolytes indicated in the three stages in FIG. 1 include a first stage low conductivity material ($ZrO_2$,), followed by a second stage having a medium conductivity electrolyte material ($CeO_2$), and finally a third stage having a high conductivity electrolyte.

The electrolyte materials utilized in the several stages maybe varied somewhat from the embodiments discussed above. For example, the $ZrO_2$ of the first stage and the $CeO_2$ of the second stage may be doped with various materials according to known techniques to enhance various properties such as stability, conductivity, etc., so long as their respective properties are not changed so much as to make them unsuitable for use in their respective stages as described. Lanthanum gallate may be used as an alternative electrolyte for the second stage. Barium cerate and strontium cerate may also be used (according to their respective conductivities) as electrolyte materials.

Figure 2:
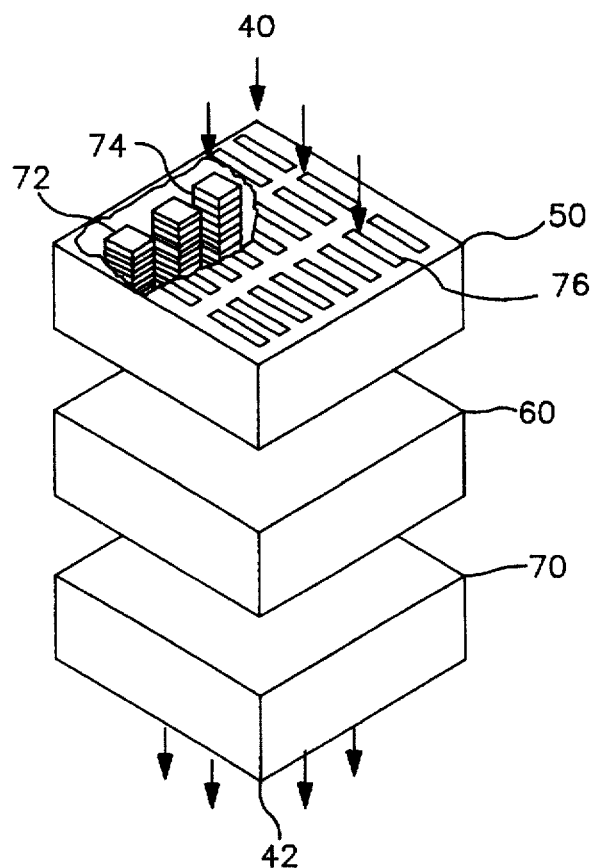
FIG. 2 is a modular embodiment of the multi-stage fuel cell arrangement wherein each module comprises a stage in the power system.

Referring to FIG. 2, a modular embodiment of the multi-stage fuel cell arrangement for an electrochemical power system includes first, second, and third fuel cell modules 50, 60, and 70 which correspond to a first, second, and third stage. Any number of modules may be included in the power system, and may be configured and juxtaposed in any arrangement allowing serial flow of a fuel gas through the modules. In a preferred arrangement, a plurality of modules are juxtaposed in a consecutive series with adjacent modules aligned and in register.

Each of first, second, and third modules 50, 60, and 70 includes a plurality of solid state electrolyte elements 72 which may be juxtaposed in any practical arrangement. In a preferred arrangement, the electrolyte elements 72 are spaced apart and arranged into a plurality of fuel cell stacks 74. The fuel cell stacks 74 may be further configured and juxtaposed within the modules in any practical arrangement, and any number of stacks may be included in each module.

Each of first, second, and third fuel cell modules 50, 60, and 70 contains electrolyte elements constructed from a different electrolyte material. For example, in a preferred embodiment, first module 50 may contain $ZrO_2$ electrolyte elements, second module 60 may contain $CeO_2$ electrolyte elements, and third module 70 may contain $Bi_2O_3$ electrolyte elements.

Fuel gases 40 may be fed to the power system through vents 76 in first module 50. Analogous vents in second and third modules 60 and 70 enable fuel gases 40 to flow in a continuous fluid path through each module in the power system. The spent fuel gas exhaust 42 from the last fuel cell module may be consumed in an after burner, subjected to a bottoming cycle, or subjected to a cogeneration cycle to recover uncombusted fuel gas.

The particular composition for the electrolyte material select for use in each module in the power system may be selected according to the conductivity of the electrolyte material used in successive fuel cell modules along the fuel gas flow pathway. Electrolyte material having relatively low conductivity, may be used in first module 50, materials with progressively higher conductivities may be used in subsequent modules. In other words, consecutive modules in a series of modules preferably contain different electrolyte materials having progressively increasing conductivities.

The operational advantages of the modular embodiment in FIG. 2 are similar to those discussed with regard to the discussion concerning FIG. 1, except that the modular embodiment in FIG. 2 provides for increased manufacturing flexibility. Fuel cell modules may be added to the system to increase the capacity of the power system without requiring extensive modification of the system. Multiple fuel cell stacks can be used because fuel gases do not become detrimentally depleted until they have passed through several stacks. To make optimal use of the fuel gases, the arrangement in FIG. 2 may be employed at each stage to give the maximum possible output for a given level of fuel flow. Fuel flow may also be increased through a device having many stacks per stage if a high output device is required.

Figure 3:
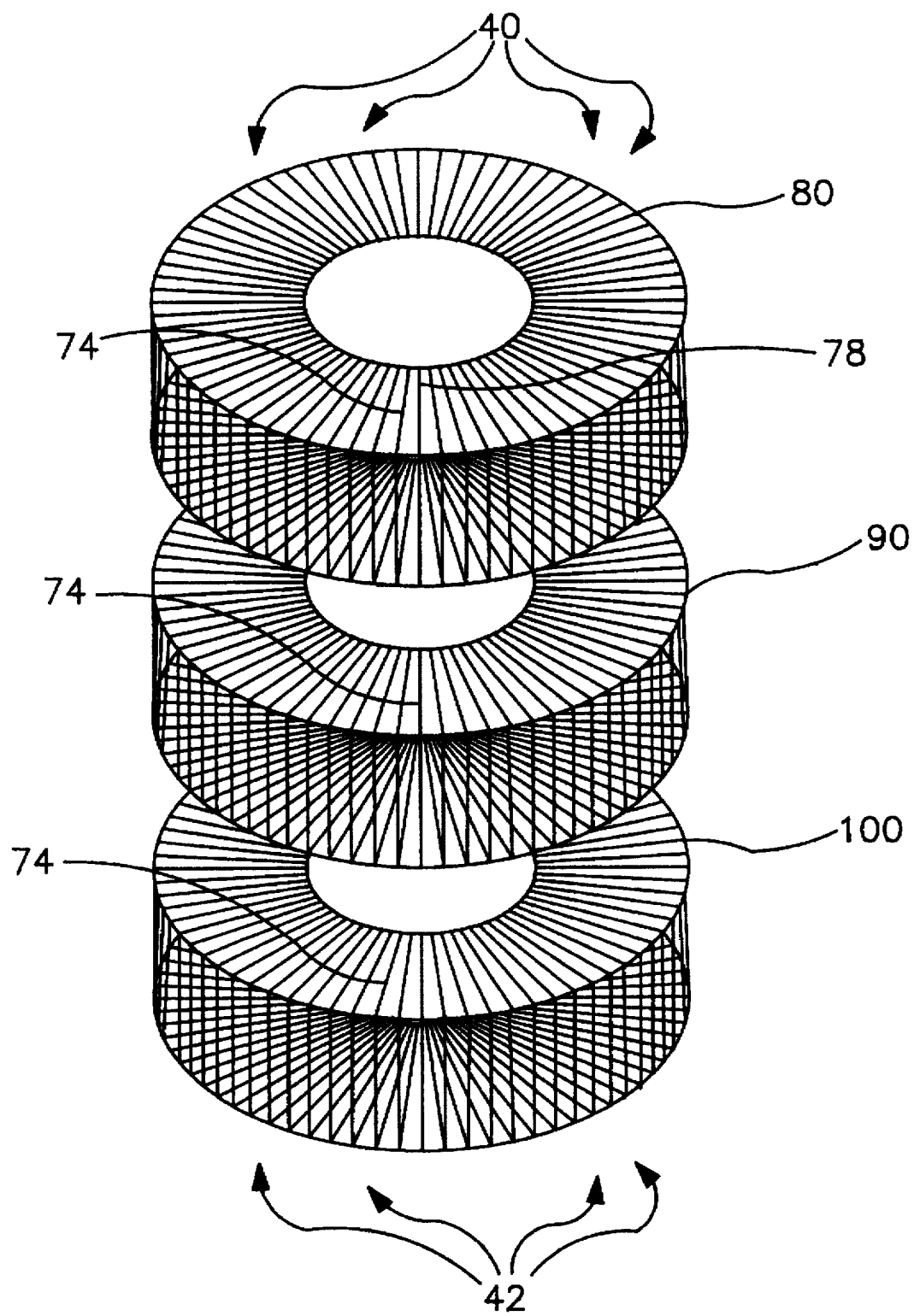
FIG. 3 is modular embodiment of the multi-stage fuel cell arrangement wherein each modular tier comprises a stage in the electrochemical power system.

Referring to FIG. 3, an alternate embodiment of a modular multi-stage fuel cell power system is illustrated having a radial arrangement of electrolyte elements rather than stacks of elements. Each of modular tiers 80, 90, and 100 includes a plurality of electrolyte elements 74 radially arranged around a central plenum 78.

A succession of consecutive tiers may be manufactured to contain different electrolyte materials previously discussed, thereby creating a multi-stage fuel cell arrangement in an electrochemical power system. In a variation, a plurality of adjacent tiers having the same electrolyte composition may comprise each stage in the power system.

The principles of operation of the embodiment illustrated in FIG. 3 are the same as discussed previously with regard to the embodiments in FIGS. 1 and 2. A fuel gas or gases 40 introduced to the electrolyte elements 74 of the multi-stage power system flows through a series of consecutive stages, each stage having electrolyte elements of progressively greater ion conductivity. The spent fuel gas 42 is exhausted from the series of stages, and may be consumed in an afterburner, or subjected to reformation, cogeneration, or a bottoming cycle.

While stacked electrolyte plates and radially arranged electrolyte plate SOFC's have been discussed herein, it is understood that other physical configurations, using known design techniques, may be provided, using the principles of the present invention and without departing from the scope of the present invention, by those of ordinary skill in the art having the present disclosure before them. For example, the electrolyte elements might be formed as shallow tubular members, with the fuel gas being passed around the outside or through the center thereof, with the electrodes on the inner and outer surfaces thereof and the ion conduction occurring radially through the electrolyte.

Although the multi-stage fuel cell arrangement for SOFC based power systems has been described with a certain degree of particularity in structure, reference herein to details of the illustrated embodiments has been made by way of example only, and numerous changes in structural details may be resorted to without departing from the scope of the following claims.

What is claimed is:

1. A multi-stage fuel cell arrangement of dissimilar solid state electrolyte elements in an electrochemical power system utilizing a reactant gaseous fuel comprising:

a first fuel cell stage having a plurality of spaced apart first cell electrolyte elements, said first cell elements consisting of thin flat first plates having a pair of opposing first flat surfaces, said first plates being constructed from a first solid state electrolyte material having a low ion conductivity and having a first electrode material adherent to at least one of said first flat surfaces, said first fuel cell stage positioned and arranged within said electrochemical power system to initially receive a flow of said gaseous fuel through the spaces between said spaced apart first cell electrolyte elements; and a second fuel cell stage having a plurality of spaced apart second cell electrolyte elements, said second cell elements consisting of thin flat second plates having a pair of opposing second flat surfaces, said second plates being constructed from a second solid state electrolyte material having an ion conductivity greater than the ion conductivity of said first electrolyte material, and having a second electrolyte material adherent to at least one of said second flat surfaces, said second fuel cell stage positioned and arranged adjacent to said first fuel cell stage within said electrochemical power system to receive said flow of said gaseous fuel subsequent to said gaseous fuel being discharged from said first fuel cell stage.

2. The multi-stage arrangement in claim 1 further including a third fuel cell stage having a plurality of spaced apart third cell electrolyte elements, said third cell elements consisting of thin flat third plates having a pair of opposing third flat surfaces, said third plates being constructed from a third solid state electrolyte material having an ion conductivity greater than the ion conductivity of said first electrolyte material and said second electrolyte material, and having a third electrode material adherent to at least one of said third flat surfaces, said third fuel cell stage positioned and arranged adjacent to said second fuel cell stage within said electrochemical power system to receive said flow of said gaseous fuel subsequent to discharge of said gaseous fuel from said second fuel cell stage.

3. The multi-stage arrangement in claim 1 further including a plurality of consecutive fuel cell stages constructed and arranged similarly to said first and second fuel cell stages but each of said consecutive fuel cell stages having plates constructed from solid state electrolyte materials having progressively greater ion conductivities than the ion conductivity of said first electrolyte material and said second electrolyte material, said consecutive fuel cell stages positioned and arranged serially downstream in said gaseous fuel flow from said second fuel cell stage within said electrochemical power system to receive said flow of said gaseous fuel subsequent to discharge of said gaseous fuel from said second fuel cell stage, said gaseous flow flowing consecutively through each of said consecutive fuel cell stages.

4. The multi-stage fuel cell arrangement of claim 1 wherein said first electrolyte material includes zirconium oxide and said second electrolyte material includes cerium oxide.

5. The multi-stage fuel cell arrangement of claim 2 wherein said first electrolyte material includes zirconium oxide, said second electrolyte material includes cerium oxide, and said third electrolyte material includes bismuth oxide.

6. The multistage fuel cell arrangement of claim 1 wherein the first electrolyte material includes zirconium oxide and the second electrolyte material includes lanthanum gallate.

7. A modular multi-stage fuel cell construction for electrochemical power systems utilizing reactant gaseous fuel comprising:

a first fuel cell module comprising a first stage having a plurality of spaced apart first module electrolyte elements, said first module elements consisting of thin flat first plates having a pair of opposing first flat surfaces, said first plates being constructed from a first solid state electrolyte material having a low ion conductivity and having a first electrode material adherent to at least one of said first flat surfaces, said first fuel cell stage positioned and arranged within said electrochemical power system to receive a flow of said gaseous fuel through the spaces between said spaced apart first module electrolyte elements; and a second fuel cell module comprising a second stage having a plurality of spaced apart second module electrolyte elements, said second module elements consisting of thin flat second plates having a pair of opposing second flat surfaces, said second plates being constructed from a second solid state electrolyte material having an ion conductivity greater than the ion conductivity of said first electrolyte material, and having a second electrode material adherent to at least one of said second flat surfaces, said second fuel cell module positioned and arranged adjacent to and in register with said first fuel cell module to receive said flow of said gaseous fuel subsequent to discharge to said gaseous fuel from said first fuel cell module.

8. The modular multi-stage fuel cell construction for electrochemical power systems in claim 7 further including a third fuel cell module constructed substantially similar to said second fuel cell module wherein said electrolyte plates in said third fuel cell stage are constructed from a third solid state electrolyte material having an ion conductivity greater than the ion conductivity of said first electrolyte material and said second electrolyte material, said third fuel cell module positioned and arranged adjacent to and in register with said second fuel cell stage to receive said flow of said gaseous fuel subsequent to discharge of said gaseous fuel from said second fuel cell stage.

9. The modular multi-stage fuel cell construction for electrochemical power systems of claim 7 wherein said first solid state electrolyte material is zirconium oxide, and said second solid state electrolyte material is cerium oxide.

10. The modular multi-stage fuel cell construction for electrochemical power systems of claim 8 wherein said first solid state electrolyte material is zirconium oxide, said second solid state electrolyte material is cerium oxide, and said third solid state electrolyte material is bismuth oxide.

11. A multi-stage fuel cell arrangement of dissimilar solid state electrolyte elements in an electrochemical power system utilizing a reactant gaseous fuel comprising:

at least a first fuel cell stage having at least one first fuel cell electrolyte element, said at least one first fuel cell electrolyte element being constructed from a first solid state electrolyte material having a low ion conductivity and having a first electrode material adherent thereto, said at least one first fuel cell stage positioned and arranged within said electrochemical power system to initially received a flow of said gaseous fuel passing by the at least one first cell electrolyte element; and at least a second fuel cell stage having at least one second fuel cell electrolyte element, said at least one second fuel cell electrolyte element being constructed from a second solid state electrolyte material having an ion conductivity higher than the first solid state electrolyte material and having a second electrode material adherent thereto, said at least one second fuel cell stage positioned and arranged within said electrochemical power system to receive the flow of said gaseous fuel after said fuel has passed by the at least one first fuel cell electrolyte element.

12. The multi-stage fuel cell arrangement according to claim 11, further comprising:

at least a third fuel cell stage having at least one third fuel cell electrolyte element, said at least one third fuel cell electrolyte element being constructed from a third solid state electrolyte material having an ion conductivity higher than the second solid state electrolyte material and having a third electrode material adherent thereto, said at least one third fuel cell stage positioned and arranged within said electrochemical power system to receive the flow of said gaseous fuel after said fuel as passed by the at least one second fuel cell electrolyte element.

13. The multi-stage fuel cell arrangement according to claim 1, wherein at least one of the electrolyte materials is fabricated, at least in part, from one of the following materials: zirconium oxide, cerium oxide, bismuth oxide, strontium cerate, barium cerate, lanthanum gallate.

14. The multi-stage fuel cell arrangement according to claim 11, wherein the at least one first and second fuel cell electrolyte elements comprise a plurality of first and second fuel cell electrolyte elements.

15. The multi-stage fuel cell arrangement according to claim 14, wherein the respective fuel cell electrolyte elements are fabricated as stacked, substantially flat plate members, with spaces interposed therebetween for the passage of the fuel gas.

16. The multi-stage fuel cell arrangement according to claim 14, wherein the respective fuel electrolyte elements are fabricated as radially arranged flat plate members, with spaces interposed radially therebetween for the passage of the fuel gas.

17. The multi-stage fuel cell arrangement according to claim 14, wherein the respective fuel cell electrolyte elements are fabricated as tubular members.

* * * * *